(12) United States Patent
Haeberle et al.

(10) Patent No.: US 6,583,214 B1
(45) Date of Patent: Jun. 24, 2003

(54) AQUEOUS COATING MATERIAL THAT IS CURED THERMALLY AND/OR BY ACTINIC RADIATION, AND ITS USE

(75) Inventors: Karl Haeberle, Speyer (DE); Heinz-Peter Rink, Münster (DE); Bernhard Lettmann, Drensteinfurt (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/937,492

(22) PCT Filed: Mar. 16, 2000

(86) PCT No.: PCT/EP00/02340

§ 371 (c)(1),
(2), (4) Date: Nov. 7, 2001

(87) PCT Pub. No.: WO00/59978

PCT Pub. Date: Oct. 12, 2000

(30) Foreign Application Priority Data

Apr. 1, 1999 (DE) .......................... 199 14 896

(51) Int. Cl.[7] .............................. C08J 3/00; C08K 3/20; C08L 75/00; C08F 8/30; C08F 283/04

(52) U.S. Cl. ................ 524/589; 427/372.2; 427/385.5; 524/591; 524/507; 524/839; 524/840; 525/123; 525/124; 525/127; 525/455

(58) Field of Search ................. 524/591, 839, 524/846, 507, 589; 525/123, 124, 127, 455; 427/372.2, 385.5

(56) References Cited

U.S. PATENT DOCUMENTS

| | | | |
|---|---|---|---|
| 3,361,844 A | 1/1968 | Hoeschele | 260/858 |
| 3,451,503 A | 6/1969 | Twomey | 181/33 |
| 3,639,147 A | 2/1972 | Benefiel et al. | 117/73 |
| 3,674,838 A | 7/1972 | Nordstrom | 260/482 |
| 3,953,644 A | 4/1976 | Camelon et al. | 428/220 |
| 4,066,591 A | 1/1978 | Seriven et al. | 260/29.2 TN |
| 4,220,679 A | 9/1980 | Backhouse | 427/401 |
| 4,268,542 A | 5/1981 | Sakakibara et al. | 427/195 |
| 4,444,954 A | 4/1984 | Mels et al. | 525/124 |
| 4,489,135 A | 12/1984 | Drexler et al. | 428/423.1 |
| 4,558,090 A | 12/1985 | Drexler et al. | 524/591 |
| 4,576,868 A | 3/1986 | Poth et al. | 428/423.1 |
| 4,675,234 A | 6/1987 | Sachs et al. | 428/328 |
| 4,710,542 A | 12/1987 | Forgione et al. | 525/127 |
| 4,719,132 A | 1/1988 | Porter, Jr. | 427/409 |
| 4,730,020 A | 3/1988 | Wilfinger et al. | 524/555 |
| 4,851,460 A | 7/1989 | Stranghöner et al. | 523/407 |
| 4,880,867 A | 11/1989 | Gobel et al. | 524/507 |
| 4,939,213 A | 7/1990 | Jacobs, III et al. | 525/329.9 |
| 4,945,128 A | 7/1990 | Hille et al. | 524/591 |
| 4,981,759 A | 1/1991 | Nakatani et al. | 428/626 |
| 5,028,639 A | 7/1991 | Treutlein et al. | 523/200 |
| 5,075,372 A | 12/1991 | Hille et al. | 524/839 |
| 5,084,541 A | 1/1992 | Jacobs, III et al. | 528/45 |
| 5,334,420 A | 8/1994 | Hartung et al. | 427/407.1 |
| 5,342,882 A | 8/1994 | Göbel et al. | 524/832 |
| 5,356,669 A | 10/1994 | Rehfuss et al. | 427/407 |
| 5,368,944 A | 11/1994 | Hartung et al. | 428/423.1 |
| 5,370,910 A | 12/1994 | Hille et al. | 427/407.1 |
| 5,416,136 A | 5/1995 | Konzmann et al. | 523/414 |
| 5,418,264 A | 5/1995 | Obloh et al. | 523/414 |
| 5,425,970 A | 6/1995 | Lahrmann et al. | 427/493 |
| 5,474,811 A | 12/1995 | Rehfuss et al. | 427/407.1 |
| 5,486,384 A | 1/1996 | Bastian et al. | 427/493 |
| 5,512,322 A | 4/1996 | Hille et al. | 427/407.1 |
| 5,552,496 A | 9/1996 | Vogt-Birnbrich et al. | 525/440 |
| 5,554,686 A | 9/1996 | Frisch, Jr. et al. | 524/588 |
| 5,569,705 A | 10/1996 | Vogt-Birnbrich et al. | 524/591 |
| 5,571,861 A | 11/1996 | Klein et al. | 524/591 |
| 5,601,878 A | 2/1997 | Kranig et al. | 427/386 |
| 5,601,880 A | 2/1997 | Schwarte et al. | 427/407.1 |
| 5,605,965 A | 2/1997 | Rehfuss et al. | 525/100 |
| 5,623,016 A | 4/1997 | Klein et al. | 524/591 |
| 5,633,037 A * | 5/1997 | Mayer | |
| 5,654,391 A | 8/1997 | Göbel et al. | 528/71 |
| 5,658,617 A | 8/1997 | Göbel et al. | 427/372.2 |
| 5,686,531 A | 11/1997 | Engelke et al. | 525/111 |
| 5,691,419 A | 11/1997 | Engelke et al. | 525/208 |
| 5,691,425 A | 11/1997 | Klein et al. | 525/455 |
| 5,707,941 A * | 1/1998 | Haberle | |
| 5,716,678 A | 2/1998 | Röckrath et al. | 427/407.1 |
| 5,760,128 A | 6/1998 | Baltus et al. | 524/591 |
| 5,852,106 A * | 12/1998 | Wilmes et al. | |
| 5,965,213 A | 10/1999 | Sacharski et al. | 427/475 |
| 6,001,915 A | 12/1999 | Schwarte et al. | 524/457 |
| 6,159,556 A | 12/2000 | Moller et al. | 427/475 |

FOREIGN PATENT DOCUMENTS

| | | | |
|---|---|---|---|
| CA | 2033530 | 7/1991 | C09D/175/04 |
| CA | 2102170 | 5/1994 | C09D/175/14 |

(List continued on next page.)

OTHER PUBLICATIONS

English Language Abstract for DE 42 31 034 A1.
English Abstract for WO 99/50359.
B. Singh and coworkers "Carbamylmethylated Melamines, Novel Crosslinkers for the Coatings Industry" in Advanced Organic Coatings Science and Technology Series, 1991, vol. 13, pp. 193 to 107.
"Methoden der organischen Chemie" Houben–Weyl, vol. 14/2, 4th edition, Georg Thieme Verlag, Stuttgart 1963.

*Primary Examiner*—Patrick D. Niland

(57) ABSTRACT

An aqueous coating material curable thermally and/or with actinic radiation, comprising
- A) at least one ionically and/or nonionically stabilized polyurethane which is saturated, unsaturated and/or grafted with olefinically unsaturated compounds and is based on bis(4-isocyanatocyclohexyl)methane with a trans/trans content of up to 30% by weight, based on the diisocyanate, as binder and
- B) at least one crosslinking agent.

17 Claims, No Drawings

FOREIGN PATENT DOCUMENTS

| | | | |
|---|---|---|---|
| CA | 221611 | 4/1996 | ......... C09D/144/14 |
| CA | 2073115 | 8/2001 | ............ C08L/75/14 |
| CA | 2102169 | 11/2001 | ......... C09D/175/14 |
| DE | 2 003 579 | 1/1970 | |
| DE | 28 18 100 A1 | 11/1978 | ............ B05D/7/18 |
| DE | 32 10 051 A1 | 9/1983 | ............ C09D/3/72 |
| DE | 33 33 072 A1 | 3/1985 | ............ C09D/3/72 |
| DE | 36 28 124 A1 | 3/1988 | ........... C09D/3/727 |
| DE | 36 36 183 A1 | 3/1988 | ............ C09D/5/38 |
| DE | 38 14 853 A1 | 11/1988 | ........... C25D/13/06 |
| DE | 39 03 804 A1 | 8/1990 | ......... C09D/175/06 |
| DE | 42 04 518 | 8/1993 | ............ B05D/1/36 |
| DE | 42 22 194 A1 | 1/1994 | ............ C09D/5/46 |
| DE | 42 31 034 A1 | 3/1994 | ........... C08G/18/75 |
| DE | 43 28 092 A1 | 2/1995 | ......... C09D/175/04 |
| DE | 196 13 547 A1 | 11/1996 | ............ C09D/5/46 |
| EP | 0 038 127 A1 | 3/1981 | ............ B05D/7/26 |
| EP | 0 069 936 A2 | 7/1982 | ............ C09D/3/00 |
| EP | 0 089 497 A2 | 2/1983 | ............ C09D/3/72 |
| EP | 0 195 831 A1 | 2/1986 | ............ C09D/3/80 |
| EP | 0 228 003 A1 | 12/1986 | ............ B05D/7/16 |
| EP | 228 003 | 12/1986 | ............ B05D/7/16 |
| EP | 0 234 361 A1 | 2/1987 | ........... C08G/18/08 |
| EP | 0 234 362 A1 | 2/1987 | ........... C08G/18/08 |
| EP | 0 245 700 A2 | 4/1987 | ......... C07D/251/54 |
| EP | 0 249 201 A2 | 6/1987 | ............ C09D/3/58 |
| EP | 0 256 540 A2 | 8/1987 | ............ C09D/3/49 |
| EP | 0 260 447 A1 | 8/1987 | ........ C08F/283/10 |
| EP | 0 276 501 A2 | 9/1987 | ............ C11D/1/42 |
| EP | 0 320 552 A1 | 12/1987 | ............ B05D/7/26 |
| EP | 0 299 148 A2 | 4/1988 | ........... C08G/18/08 |
| EP | 0 297 576 A1 | 6/1988 | ............ C09D/3/72 |
| EP | 0 354 261 A1 | 8/1988 | ........... C08G/18/50 |
| EP | 0 394 737 A1 | 4/1990 | ......... C09D/175/06 |
| EP | 0 401 565 A1 | 5/1990 | ............ C09D/5/02 |
| EP | 0 424 705 A2 | 10/1990 | ........ C08F/283/00 |
| EP | 0 593 454 B1 | 3/1991 | ............ B05D/7/26 |
| EP | 0 522 419 A1 | 6/1992 | ........... C08G/18/67 |
| EP | 0 522 420 A2 | 6/1992 | .............. C08J/3/03 |
| EP | 0 523 610 A1 | 7/1992 | ......... C09D/163/00 |
| EP | 0 536 712 A2 | 10/1992 | ......... C09D/201/02 |
| EP | 0 540 884 A1 | 10/1992 | ............ B05N/3/06 |
| EP | 0 568 967 A2 | 5/1993 | ............ B05D/3/00 |
| EP | 0 581 211 A1 | 7/1993 | ........... C08G/18/08 |
| EP | 0 584 818 B1 | 8/1993 | ........... C08G/18/08 |
| EP | 0 590 484 A1 | 9/1993 | ........... C08G/18/08 |
| EP | 0 594 068 A1 | 10/1993 | ......... C09D/201/02 |
| EP | 0 594 142 A1 | 10/1993 | ........... C08L/57/12 |
| EP | 0 596 460 A2 | 11/1993 | ......... C09D/201/00 |
| EP | 0 596 461 A2 | 11/1993 | ......... C09D/201/00 |
| EP | 0 604 992 A1 | 12/1993 | ............ F01N/3/28 |
| EP | 0 594 071 A1 | 4/1994 | ......... C09D/201/02 |
| EP | 0 624 577 A1 | 5/1994 | ......... C07D/251/70 |
| EP | 0 708 788 B1 | 6/1994 | ........... C08G/18/08 |
| EP | 0 634 431 A1 | 7/1994 | ........... C08G/18/21 |
| EP | 0 521 928 B1 | 8/1994 | ......... C08F/299/06 |
| EP | 0 649 865 A1 | 10/1994 | ........... C08G/18/67 |
| EP | 0 669 356 A1 | 2/1995 | ........... C08G/18/83 |
| EP | 0 678 536 A1 | 4/1995 | ........... C08G/18/08 |
| EP | 0 678 537 A1 | 4/1995 | ........... C08G/18/75 |
| EP | 0 872 500 A1 | 4/1998 | ........... C08G/18/38 |
| GB | 112338 | 6/1967 | ......... C07C/119/04 |
| GB | 1246601 | 1/1970 | ........... C07C/69/54 |
| GB | 20 12 191 A | 12/1978 | ............ C05D/1/36 |
| WO | WO 90/01041 | 2/1990 | ........... C08G/18/08 |
| WO | WO 91/13923 | 9/1991 | ........... C08G/18/08 |
| WO | WO 92/15405 | 9/1992 | ............ B05D/5/06 |
| WO | WO92/17546 | 10/1992 | ........... C08L/75/04 |
| WO | WO 92/22615 | 12/1992 | ......... C09D/151/08 |
| WO | WO93/17060 | 9/1993 | ........... C08G/63/20 |
| WO | WO94/10211 | 5/1994 | ............. C08F/8/30 |
| WO | WO94/10212 | 5/1994 | ............. C08F/8/30 |
| WO | WO94/10213 | 5/1994 | ............. C08F/8/30 |
| WO | WO 94/22968 | 10/1994 | ......... C09D/133/06 |
| WO | WO 94/22969 | 10/1994 | ......... C09D/133/06 |
| WO | WO 95/14721 | 6/1995 | ......... C08F/290/14 |
| WO | WO96/12747 | 5/1996 | ......... C08F/285/00 |
| WO | WO96/12754 | 5/1996 | ........... C08G/63/20 |
| WO | WO97/12945 | 4/1997 | ............ C09D/5/04 |
| WO | WO97/49745 | 12/1997 | ........... C08G/18/08 |
| WO | WO97/49747 | 12/1997 | ........... C08G/18/75 |
| WO | WO 99/50359 | 10/1999 | ............ C09D/5/00 |

* cited by examiner

AQUEOUS COATING MATERIAL THAT IS CURED THERMALLY AND/OR BY ACTINIC RADIATION, AND ITS USE

The present invention relates to a novel aqueous coating material based on polyurethane, to its preparation and to its use in automotive OEM finishing and refinish, in industrial coating, including coil coating and container coating, in the coating of plastics, and in furniture coating.

Aqueous coating materials which cure physically without crosslinking agents and comprise at least one ionically and/or nonionically stabilized polyurethane based on bis(4-isocyanatocyclohexyl)methane with a trans/trans content of up to 18 mol %, based on the diisocyanate, in dispersion in an aqueous phase are known from the German patent DE-A-44 14 032. They have very good film-forming properties and provide clear, transparent coatings. In the patent it is also stated that these known coating materials may also comprise pigments.

Aqueous coating materials which are curable thermally and/or with actinic radiation and comprise an ionically and/or nonionically stabilized polyurethane which is saturated, unsaturated and/or grafted with olefinically unsaturated compounds and is based on bis(4-isocyanatocyclohexyl)methane with a trans/trans content of up to 18 mol %, based on the diisocyanate, and also a crosslinking agent are not disclosed in the patent.

Thermally curable aqueous coating materials which comprise a crosslinking agent and an ionically and/or nonionically stabilized polyurethane which is saturated, unsaturated and/or grafted with olefinically unsaturated compounds and is based on aliphatic, cycloaliphatic, aliphatic-cycloaliphatic, aromatic, aliphatic-aromatic, and/or cycloaliphatic-aromatic polyisocyanates, and the corresponding coatings, are known, for example, from the patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747 or EP-A-0 401 565. These known aqueous coating materials and the coatings produced with them already have very good performance properties. However, the finely dispersed polyurethanes commonly employed in these aqueous coating materials may for no discernible reason form coagulum which manifests itself unpleasantly in the coatings.

It is an object of the present invention to provide a novel coating material curable thermally and/or with actinic radiation which comprises at least one ionically and/or nonionically stabilized polyurethane, saturated, unsaturated and/or grafted with olefinically unsaturated compounds, in dispersion in an aqueous phase and which combines a profile of performance properties which matches or even exceeds that of the prior art with very little, if any, tendency to form coagulum.

The invention accordingly provides the novel aqueous coating material, curable thermally and/or with actinic radiation, which comprises A) at least one ionically and/or nonionically stabilized polyurethane which is saturated, unsaturated and/or grafted with olefinically unsaturated compounds and is based on bis(4-isocyanatocyclohexyl)methane with a trans/trans content of up to 30% by weight, based on the diisocyanate, as binder and B) at least one crosslinking agent.

In the text below, the novel aqueous coating material curable thermally and/or with actinic radiation is referred to as the "coating material of the invention".

The invention also provides the novel process for producing a single-coat or multicoat clear or color and/or effect coating system by applying at least one film of the coating material of the invention to a primed or unprimed substrate and curing thermally and/or with actinic radiation the resultant wet film(s).

In the text below, this novel process is referred to as the "first process of the invention".

The invention additionally provides the novel process for producing a multicoat color and/or effect coating system by the wet-on-wet technique, said process comprising at least the following steps:

(I) applying an aqueous basecoat film to a primed or unprimed substrate, (II) flashing off and provisionally drying the resultant aqueous basecoat film, (III) applying a clearcoat film to the aqueous basecoat film, and (IV) curing the two wet films thermally and, if desired, with actinic light; and involving the use as aqueous basecoat material and/or as clearcoat material of at least one aqueous coating material which is (i) physically curing and/or (ii) which cures thermally and/or with actinic radiation, said coating material comprising at least one ionically and/or nonionically stabilized polyurethane (A) which is saturated, unsaturated and/or grafted with olefinically unsaturated compounds and is based on bis(4-isocyanatocyclohexyl)methane with a trans/trans content of up to 30% by weight, based on the diisocyanate.

The invention additionally provides a variant of the second process of the invention, said process comprising at least the following steps:

(I) applying an aqueous basecoat film to a primed or unprimed substrate, (II) flashing off and provisionally drying the resultant aqueous basecoat film, (III) applying a first clearcoat film to the aqueous basecoat film, (IV) curing the two wet films thermally and, if desired, with actinic light, and (V) applying a second clearcoat film, materially different from the first clearcoat film, to the clearcoat film cured in process step (IV)

or alternatively (I) applying an aqueous basecoat film to a primed or unprimed substrate, (II) flashing off and provisionally drying the resultant aqueous basecoat film, (III) applying a first clearcoat film to the aqueous basecoat film, and (IV) flashing off and provisionally drying the resultant clearcoat film, (V) applying a second, materially different, clearcoat film to the clearcoat film provisionally dried in process step (IV), and (VI) conjointly curing the coating films (extended wet-on-wet technique);

and involving the use as aqueous basecoat material and/or as at least one of the clearcoat materials of at least one aqueous coating material which is
(i) physically curing and/or
(ii) which cures the thermally and/or with actinic radiation,
said coating material comprising at least one ionically and/or nonionically stabilized polyurethane (A) which is saturated, unsaturated and/or grafted with olefinically unsaturated compounds and is based on bis(4-isocyanatocyclohexyl) methane with a trans/trans content of up to 30% by weight, based on the diisocyanate.

In the text below, the novel processes for producing a multilayer color and/or effect coating system by the wet-on-wet technique are referred to collectively as the "second process of the invention".

In the context of the present invention, the term "physical curing" denotes the curing of a layer of a coating material by filming, possibly following drying of the layer. Normally, no crosslinking agents are necessary for this purpose. If desired, the physical curing may be assisted by atmospheric oxygen or by exposure to actinic radiation.

The coating material of the invention is curable thermally and/or with actinic radiation.

In the context of the present invention, the term "thermal curing" denotes the heat-initiated curing of a layer of coating material, normally employing a separate crosslinking agent. Customarily, this is referred by those in the art as external crosslinking. Where the crosslinking agents are already incorporated in the binders, the term self-crosslinking is also used. In accordance with the invention, external crosslinking is of advantage and is therefore employed with preference.

In the context of the present invention, actinic radiation means electron beams or, preferably, UV radiation. Curing by UV radiation is commonly initiated by means of free-radical or cationic photoinitiators.

Where thermal curing and curing with actinic light are employed conjointly for one coating material, the term "dual cure" is also used.

The coating material of the invention may be a one-component (1K) system.

In the context of the present invention a one-component (1K) system is a thermosetting coating material in which the binder and the crosslinking agent are present alongside one another, i.e., in one component. A prerequisite for this is that the two constituents crosslink with one another only at relatively high temperatures and/or on exposure to actinic radiation.

The coating material of the invention may also be a two-component (2K) or multicomponent (3K, 4K) system.

In the context of the present invention this term refers to a coating material in which in particular the binder and the crosslinking agent are present separately from one another in at least two components which are not combined until shortly before application. This form is chosen when binder and crosslinking agent react with one another even at room temperature. Coating materials of this kind are employed primarily to coat thermally sensitive substrates, especially in automotive refinish.

Depending on pigmentation, the coating material of the invention is used to produce transparent clearcoats and/or to produce aqueous color and/or effect basecoats. With particular preference it is used to produce aqueous basecoat.

The first inventively essential constituent of the coating material of the invention is its binder (A).

In accordance with the invention this binder is an ionically and/or nonionically stabilized polyurethane which is saturated, unsaturated and/or grafted with olefinically unsaturated compounds and is based on bis (4-isocyanatocyclohexyl)methane with a trans/trans content of up to 30% by weight, based on the diisocyanate, which is referred to below for the sake of brevity as "polyurethane (A) for inventive use".

Advantageously, the polyurethane (A) for inventive use, depending on the type of stabilization, has an acid number or amine number of from 10 to 250 mg KOH/g (ionic stabilization or nonionic plus ionic stabilization) or from 0 to 10 mg KOH/g (nonionic stabilization), an OH number of from 30 to 350 mg KOH/g, and a number-average molecular weight of from 1 500 to 55 000 daltons.

The inventively essential starting product of the polyurethane for inventive use is liquid bis(4-isocyanatocyclohexyl) methane with a trans/trans content of up to 30% by weight, preferably of up to 25% by weight, and in particular up to 20% by weight. When trans/trans contents of more than 30% by weight are employed, the advantages achieved by virtue of the present invention are no longer reliably and securely realized.

The liquid bis(4-isocyanatocyclohexyl)methane with a trans/trans content of up to 30% by weight, preferably of up to 25% by weight, and in particular up to 20% by weight, and its preparation by phosgenization of isomer mixtures of bis(4-aminocyclohexyl)methane or by fractional crystallization of commercially customary bis(4-isocyanatocyclohexyl)methane is known from the patents DE-A-44 14 032, GB-A-1220717, DE-A-16 18 795 or DE-A-17 93 785.

Besides the liquid bis(4-isocyanatocyclohexyl)methane it is also possible to use other aliphatic, cycloaliphatic, aliphatic-cycloaliphatic, aromatic, aliphatic-aromatic and/or cycloaliphatic-aromatic polyisocyanates in minor amounts for the preparation of the polyurethanes for inventive use. In the context of the present invention, "minor amounts" means a fraction of other polyisocyanates which is such that it does not narrow the inventively achieved profile of performance properties but instead varies it in an advantageous manner. In general, the fraction of other polyisocyanates should not exceed 40 mol %, preferably 30 mol %, and in particular 20 mol %, based in each case on the overall amount of the polyisocyanates used for the preparation.

Examples of other polyisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimer fatty acids, such as are sold under the commercial designation DDI 1410 by Hendel and described in the patents DO 97/49745 and WO 97/49747, especially 2-heptyl-3,4-bis(9-isocyanatononyl)-1-pentylcyclohexane, or 1,2-, 1,4- or 1,3-bis (isocyanatomethyl)cyclohexane, 1,2-, 1,4- or 1,3-bis(2- isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, tolylene diisocyanate, xylylene diisocyanate, biphenylene diisocyanate, naphthylene diisocyanate or diphenylmethane diisocyanate.

For the preparation of the polyurethanes (A) for inventive use the following are also used:

saturated and unsaturated polyols of high and low molecular mass, especially diols and, in minor amounts, triols for the purpose of introducing branches, polyamines, amino alcohols, and compounds by means of which stabilizing (potentially) ionic and/or nonionic functional groups are introduced.

Examples of suitable polyols are saturated or olefinically unsaturated polyesterpolyols which are prepared by reacting unsulfonated or sulfonated saturated and/or unsaturated polycarboxylic acids or their esterifiable derivatives, together if desired with monocarboxylic acids, and also saturated and/or unsaturated polyols, together if desired with monools.

Examples of suitable polycarboxylic acids are aromatic, aliphatic and cycloaliphatic polycarboxylic acids. Preference is given to using aromatic and/or aliphatic polycarboxylic acids.

Examples of suitable aromatic polycarboxylic acids are phthalic acid, isophthalic acid, terephthalic acid, phthalic, isophthalic, or terephthalic monosulfonate, or halophthalic acids, such as tetrachloro- and/or tetrabromophthalic acid, of which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid, dodecanedicarboxylic acid or dimer fatty acids or maleic acid, fumaric acid or itaconic acid, of which adipic acid, glutaric acid, azelaic acid, sebacic acid, dimer fatty acids and maleic acid are advantageous and therefore used with preference.

Examples of suitable cycloaliphatic and cyclic unsaturated polycarboxylic acids are 1,2-cyclobutane dicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Also suitable are the esterifiable derivatives of the abovementioned polycarboxylic acids, such as, for example, their monoesters or polyesters with aliphatic alcohols having from 1 to 4 carbon atoms or hydroxy alcohols having from 1 to 4 carbon atoms. Moreover, it is also possible to use the anhydrides of the abovementioned polycarboxylic acids, where they exist.

If desired it is possible, together with the polycarboxylic acids, to use monocarboxylic acids too, such as benzoic acid, tert-butylbenzoic acid, lauric acid, isononanoic acid, fatty acids of naturally occurring oils, acrylic acid, methacrylic acid, ethacrylic acid or crotonic acid, for example. As monocarboxylic acid it is preferred to use isononanoic acid.

Examples of suitable polyols are diols and triols, especially diols. Normally, triols are used in minor amounts alongside the diols in order to introduce branches into the polyesterpolyols.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, or the positionally isomeric diethyloctanediols. These diols may also be used per se for the preparation of the polyurethanes (A) for inventive use.

Further examples of suitable diols are diols of the formula I or II:

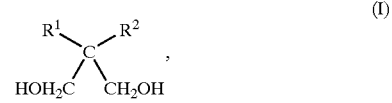

in which $R^1$ and $R^2$ each represent an identical or different radical and stand for an alkyl radical having from 1 to 18 carbon atoms, an aryl radical or a cycloaliphatic radical, with the proviso that $R^1$ and/or $R^2$ may not be methyl;

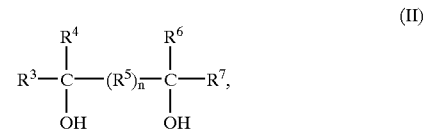

in which $R^3$, $R^4$, $R^6$ and $R^7$ each represent identical or different radicals and stand for an alkyl radical having from 1 to 6 carbon atoms, a cycloalkyl radical or an aryl radical and $R^5$ represents an alkyl radical having from 1 to 6 carbon atoms, an aryl radical or an unsaturated alkyl radical having from 1 to 6 carbon atoms, and n is either 0 or 1.

Suitable diols I of the general formula I are all propanediols of the formula in which either $R^1$ or $R^2$ or $R^1$ and $R^2$ is not equal to methyl, such as 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-di-hydroxymethylbicyclo[2.2.1]heptane, 2,2-diethylpropane-1,3-diol, 2,2-dipropylpropane-1,3-diol or 2-cyclohexyl-2-methylpropane-1,3-diol and others, for example.

As diols II of the general formula II it is possible, for example, to use 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4(2'hydroxypropyl)-benzene and 1,3-(2'-hydroxypropyl)benzene.

Of these diols, hexanediol and neopentyl glycol are particularly advantageous and are used with particular preference.

The abovementioned diols may also be used per se for the preparation of the polyurethanes (A) for inventive use.

Examples of suitable triols are trimethylolethane, trimethylolpropane or glycerol, especially trimethylolpropane.

The abovementioned triols may also be used per se for the preparation of the polyurethanes (A) for inventive use (cf. the patent EP-A-0 339 433).

If desired, minor amounts of monools may be used as well. Examples of suitable monools are alcohols or phenols such as ethanol, propanol, n-butanol, sec-butanol, tert-butanol, amyl alcohols, hexanols, fatty alcohols, allyl alcohol or phenol.

The polesterpolyols may be prepared in the presence of small amounts of an appropriate solvent as entrainer. Entrainers used include, for example, aromatic hydrocarbons, such as particularly xylene and (cyclo)-aliphatic hydrocarbons, e.g., cyclohexane or methylcyclohexane.

Further examples of suitable polyols are polyesterdiols which are obtained by reacting a lactone with a diol. They are notable for the presence of terminal hydroxyl groups and repeating polyester units of the formula —(—CO—(CHR$^8$)$_m$—CH$_2$—O—)—. In this formula the index m is preferably from 4 to 6 and the substituent R$^8$=hydrogen, an alkyl, cycloalkyl or alkoxy radical. No one substituent contains more than 12 carbon atoms.

The total number of carbon atoms in the substituent does not exceed 12 per lactone ring. Examples thereof are hydroxycaproic acid, hydroxybutyric acid, hydroxydecanoic acid and/or hydroxystearic acid.

For the preparation of the polyesterdiols preference is given to the unsubstituted ε-caprolactone, in which m has the value 4 and all R$^8$ substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanolamine or else urea, with caprolactone. Further suitable high molecular mass diols include polylactamdiols, prepared by reacting, for example, ε-caprolactam with low molecular mass diols.

Further examples of suitable polyols are polyetherpolyols, especially those having a number-average molecular weight of from 400 to 5 000, in particular from 400 to 3 000. Highly suitable polyetherdiols are, for example, polyetherdiols of the general formula H—(O—(CHR$^9$)$_o$—)$_p$OH, in which the substituent R$^9$=hydrogen or is a lower, unsubstituted or substituted alkyl radical, the index o=2 to 6, preferably 3 to 4, and the index p=2 to 100, preferably 5 to 50. Cited as particularly suitable examples are linear or branched polyetherdiols such as poly(oxyethylene) glycols, poly(oxypropylene)glycols and poly(oxybutylene)glycols.

The polyetherdiols should on the one hand not introduce excessive amounts of ether groups, since otherwise the polyurethanes (A) for inventive use that are formed undergo incipient swelling in water. On the other hand, they may be used in amounts which ensures the nonionic stabilization of the polyurethanes (A). In that case they serve as the functional nonionic groups (a3) described below.

Further examples of suitable polyols are poly(meth)acrylatediols, polycarbonatediols or polyolefinpolyols such as POLYTAIL® from Mitsubishi Chemical Group.

The polyurethane (A) for inventive use contains either
  (a1) functional groups which can be converted into cations by neutralizing agents and/or quaternizing agents, and/or cationic groups, especially ammonium groups,
or
  (a2) functional groups which can be converted into anions by neutralizing agents, and/or anionic groups, especially carboxylic acid groups and/or carboxylate groups,
and/or
  (a3) nonionic hydrophilic groups, especially poly(alkylene ether) groups.

Examples of suitable functional groups (a1) for inventive use which may be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (a1) for inventive use are primary, secondary, tertiary or quaternary ammonium groups, tertiary sulfonium groups or quaternary phosphonium groups, preferably quaternary ammonium groups or quaternary ammonium groups, tertiary sulfonium groups, but especially tertiary sulfonium groups.

Examples of suitable functional groups (a2) for inventive use which may be converted into anions by neutralizing agents are carboxylic acid, sulfonic acid or phosphonic acid groups, especially carboxylic acid groups.

Examples of suitable anionic groups (a2) for inventive use are carboxylate, sulfonate or phosphonate groups, especially carboxylate groups.

Examples of suitable neutralizing agents for functional groups (a1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (a2) convertible into anions are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine and the like, for example. The neutralization may take place in organic phase or in aqueous phase. A preferred neutralizing agent used is dimethylethanolamine.

The overall amount of neutralizing agent used in the coating composition of the invention is chosen so that from 1 to 100 equivalents, preferably from 50 to 90 equivalents, of the functional groups (a1) or (a2) of the polyurethane (A) for inventive use are neutralized.

Of these functional (potentially) ionic groups (a1) and (a2) and functional nonionic groups (a3), the (potentially) anionic groups (a2) are advantageous and are therefore used with particular preference.

The introduction of (potentially) anionic groups (a2) into the polyurethane molecules takes place by way of the incorporation of compounds which contain at least one isocyanate-reactive group and at least one group capable of forming anions in the molecule; the amount to be used may be calculated from the target acid number.

Examples of suitable compounds of this kind are those which contain two isocyanate-reactive groups in the molecule. Suitable isocyanate-reactive groups are, in particular, hydroxyl groups, and also primary and/or secondary amino groups. Accordingly, it is possible, for example, to use alkanoic acids having two substituents on the a carbon atom. The substituent may be a hydroxyl group, an alkyl group or, preferably, an alkylol group. These alkanoic acids have at least one, in general, from 1 to 3, carboxyl groups in the molecule. They have from 2 to about 25, preferably from 3 to 10, carbon atoms. Examples of suitable alkanoic acids are dihydroxypropionic acid, dihydroxysuccinic acid and dihydroxybenzoic acid. One particularly preferred group of alkanoic acids are the α,α-dimethylolalkanoic acids of the general formula R$^{10}$—C(CH$_2$OH)$_2$COOH, in which R$^{10}$ stands for a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid and 2,2-dimenthylolpentanoic acid. The preferred dihydroxyalkanoic acid is 2,2-dimethylolpropionic acid. Examples of compounds containing amino groups are α,δ-diaminovaleric acid, 3,4-diaminobenzoic acid, 2,4-diaminotoluenesulfonic acid and 2,4-diaminodiphenyl ether sulfonic acid.

Nonionic stabilizing poly(oxyalkylene) groups (a3) may be introduced as lateral or terminal groups into the polyurethane molecules. For this purpose it is possible, for example, to use alkoxypoly(oxyalkylene) alcohols having the general formula $R^{11}O$—(—$CH_2$—$CH^{12}$—O—)$_r$ H in which $R^{11}$ stands for an alkyl radical having from 1 to 6 carbon atoms, $R^{12}$ stands for a hydrogen atom or an alkyl radical having from 1 to 6 carbon atoms and the index r stands for a number between 20 and 75. (Cf. the patents EP-A-0 354 261 or EP-A-0 424 705).

The use of polyols, polyamines and amino alcohols leads to the molecular weight increase of the polyurethanes (A).

Suitable polyols for the chain extension are polyols having up to 36 carbon atoms per molecule such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclo-hexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A or mixtures thereof (cf. patents EP-A-0 339 433, EP-A-0 436 941, EP-A-0 517 707).

Examples of suitable polyamines have at least two primary and/or secondary amino groups. Polyamines are essentially alkylene polyamines having from 1 to 40 carbon atoms, preferably from about 2 to 15 carbon atoms. They may carry substituents which have no hydrogen atoms that are reactive with isocyanate groups. Examples are polyamines having a linear or branched aliphatic, cycloaliphatic or aromatic structure and containing at least two primary amino groups.

As diamines, mention may be made of hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethyleneothanolamine. Preferred diamines are hydrazine, alkyl- or cycloalkyldiamines such as propylenediamine and 1-amino-3-aminomethyl-3,5,5-trimethylcyclohexane.

It is also possible to use polyamines which contain more than two amino groups in the molecule. In these cases, however, it must be ensured—for example, by using monoamines as well—that crosslinked polyurethane resins are not obtained. Polyamines of this kind which can be used are diethylenetriamine, triethylenetetramine, dipropylenediamine and dibutylenetriamine. An example to be mentioned of a monoamine is ethylhexylamine (cf. the patent EP-A-0 089 497).

Examples of suitable amino alcohols are ethanolamine or diethanolamine.

The polyurethanes (A) for inventive use may contain terminal and/or lateral olefinically unsaturated groups. Groups of this kind may be introduced, for example, with the aid of compounds which contain at least one isocyanate-reactive group, especially hydroxyl group, and at least one vinyl group. Examples of suitable compounds of this kind are trimethylolpropane monoallyl ether or trimethylolpropane mono(meth)acrylate).

The polyurethanes (A) for inventive use may be grafted with ethylenically unsaturated compounds. Examples of suitable polyurethanes (A) for inventive use which are present in the form of graft copolymers are known from the patents EP-A-0 521 928, EP-A-0 522 420, EP-A-0 522 419 or EP-A-0 730 613.

In terms of its method the preparation of the polyurethanes (A) for inventive use has no special features but instead takes place in accordance with the customary and known methods, as described in the prior art cited at the outset.

The second inventively essential constituent of the coating material of the invention is at least one crosslinking agent (B).

Examples of suitable crosslinking agents (B) for the one-component (1K) systems are amino resins, compounds or resins containing anhydride groups, compounds or resins containing epoxide groups, tris(alkoxycarbonylamino) triazines, compounds or resins containing carbonate groups, blocked and/or unblocked polyisocyanates, beta-hydroxyalkylamides, and also compounds containing on average at least two groups capable of transesterification, examples being reaction products of malonic diesters and polyisocyanates or of esters and partial esters of polyhydric alcohols of malonic acid with monoisocyanates, as described by the European patent EP-A-0 596 460.

Crosslinking agents of this kind are well known to the skilled worker and are offered as commercial products by numerous companies.

In this context it is possible to use any amino resins suitable for topcoat materials or transparent clearcoat materials, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers "Carbamylmethylated Melamines, Novel Crosslinkers for the Coatings Industry" in Advanced Organic Coatings Science and Technology Series, 1991, volume 13, pages 193 to 207.

Examples of suitable polyepoxides are in particular all known aliphatic and/or cycloaliphatic and/or aromatic polyepoxides, based for example on bisphenol A or bisphenol F. Examples of suitable polyepoxides also include the polyepoxides obtainable commercially under the designations Epikote® from Shell, Denacol® from Nagase Chemicals Ltd, Japan, such as, for example, Denacol EX-411 (pentaerythritol polyglycidyl ether), Denacol EX-321 (trimethylolpropane polyglycidyl ether), Denacol® EX-512 (polyglycerol polyglycidyl ether) and Denacol® EX-521 (polyglycerol polyglycidyl ether).

The suitable tris(alkoxycarbonylamino)triazines had the following formula:

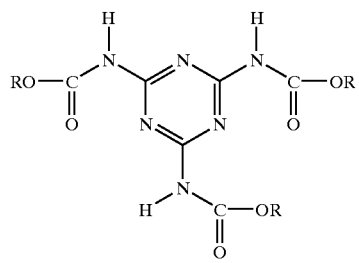

Examples of suitable tris(alkoxycarbonylamino)triazines are described in the patents U.S. Pat. No. 4,939,213, U.S. Pat. No. 5,084,541 or EP-A-0 624 577. Use is made in particular of the tris(methoxy-, tris(butoxy- and/or tris(2-ethylhexoxycarbonylamino)triazines.

Of advantage are the methyl butyl mixed esters, the butyl 2-ethylhexyl mixed esters, and the butyl esters. These have the advantage over the straight methyl ester of better solubility in polymer melts, and also tend less to crystallize out.

An example of a suitable polyanhydride is polysuccinic anhydride.

Examples of suitable beta-hydroxyalkylamides are N,N,N',N'-tetrakis(2-hydroxyethyl)adipamide or N,N,N',N'-tetrakis(2-hydroxypropyl)adipamide.

Further examples of suitable crosslinking agents are the blocked polyisocyanates.

Examples of suitable blocking agents are the blocking agents known from U.S. Pat. No. 4,444,954:

(i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

(ii) lactams, such as ε-caprolactam, δ-valerolactam, γ-butyrolactam or β-propiolactam;

(iii) active methylenic compounds, such as diethyl malonate, dimethyl malonate, ethyl or methyl acetoacetate, or acetylacetone;

(iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnapthylamine, xylidine, N-phenylxylidine, carbazole, aniline, napthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutylketoxime, diacetylmonoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also xvii) mixtures of these blocking agents, especially dimethylpyrazole and triazoles, malonic esters and acetoacetic esters, or dimethylpyrazole and succinimide.

Examples of suitable organic polyisocyanates for blocking are in particular the so-called paint polyisocyanates containing isocyanate groups attached to aliphatic, cycloaliphatic, araliphatic and/or aromatic moieties. Preference is given to polyisocyanates containing from 2 to 5 isocyanate groups per molecule and having viscosities of from 100 to 10 000, preferably from 100 to 5 000. Additionally, the polyisocyanates may have undergone customary hydrophilic or hydrophobic modification.

Further examples of suitable polyisocyanates for blocking are described in "Methoden der organischen Chemie", Houben-Weyl, volume 14/2, 4th edition, Georg Thieme Verlag, Stuttgart 1963, page 61 to 70, and by W. Siefken, Liebigs Annalen der Chemie, volume 562, pages 75 to 136. Examples of those suitable are the isocyanato-containing polyurethane prepolymers which may be prepared by reacting polyols with an excess of polyisocyanates and which are preferably of low viscosity.

Further examples of suitable polyisocyanates for blocking are polyisocyanates containing isocyanurate, biuret, allophanate, iminooxadiazinedone, urethane, urea and/or uretdione groups. Polyisocyanates containing urethane groups, for example, are obtained by reacting some of the isocyanate groups with polyols, such as trimethylolpropane and glycerol, for example. Preference is given to using aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate, dicyclohexylmethane 4,4'-diisocyanate, diisocyanates derived from dimer fatty acids, as sold under the commercial designation DDI 1410 by Henkel and described in the patents DO 97/49745 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane or mixtures of these polyisocyananates.

Very particular preference is given to using mixtures of polyisocyanates containing uretdione and/or isocyanurate and/or allophanate groups and based on hexamethylene diisocyanate, such as are formed by catalytic oligomerization of hexamethylene diisocyanate using appropriate catalysts.

Examples of suitable crosslinking agents for the two-component (2K) or multicomponent (3K, 4K) systems are the unblocked polyisocyanates mentioned above.

The coating material of the invention may comprise customary coatings additives (D) in effective amounts. The nature and amount of the additives (D) are guided primarily by the intended use of the coating material of the invention. It is essential that these additives (D) should not be volatile under the processing and application conditions of the coating material of the invention.

Where the coating materials of the invention is used as topcoat material or aqueous basecoat material, it comprises color and/or effect pigments (D) in customary and known amounts. The pigments (D) may consist of organic or inorganic compounds and may impart effect and/or color. The coating material of the invention therefore ensures, owing to this large number of appropriate pigments (D), a universal breadth of use of the coating materials and permits the realization of a large number of color shades and optical effects.

As effect pigments (D) it is possible to use metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example. Examples of suitable inorganic color pigments (D) are titanium dioxide, iron oxides, Sicotrans yellow and carbon black. Examples of suitable organic color pigments are indanthrene blue, Cromophthal red, Irgazin orange, and Heliogen green.

Furthermore, the coating material of the invention may comprise organic and inorganic fillers (D) in customary and known, effective amounts. Examples of suitable fillers are chalk, calcium sulfates, barium sulfate, silicates such as talc or kaolin, silicas, oxides such as aluminum hydroxide or magnesium hydroxide, nano-particles or organic fillers such as textile fibers, cellulose fibers, polyethylene fibers or wood flour.

These additives (D) are omitted if the coating materials of the invention are used as clearcoat materials.

Examples of suitable additives (D) which may be present both in the inventive clearcoat materials and topcoat materials are UV absorbers;

free-radical scavengers;

crosslinking catalysts;

slip additives;

polymerization inhibitors;

defoamers;

emulsifiers, especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

Wetting agents such as siloxanes, fluorine compounds, carboxylic monoesters, phosphoric esters, polyacrylic acids and their copolymers, or polyurethanes;

adhesion promoters;

leveling agents;

film formation auxiliaries such as cellulose derivatives;

flame retardants;

rheology control additives, such as those known from the patents WO 94/22968, EP-A-0 276 501, EP-A-0 249 201 or WO 97/12945; crosslinked polymeric microparticles, such as are disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly (meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; or photoinitiators, such as photoinitiators of the Norrish II type, whose mechanism of action is based on an intramolecular variant of the hydrogen abstraction reactions such as occur diversely in the case of photochemical reactions; by way of example, reference may be made here to Römpp Chemie Lexikon, 9th expanded and revised edition, Georg Thieme Verlag Stuttgart, vol. 4, 1991.

Further examples of suitable additives (D) are described in the textbook "Lackadditive" [Additives for Coatings] by Johan Bieleman, Wiley-VCH, Weinheim, New York, 1998.

The coating material of the invention may further comprise reactive diluents (E) for the thermal curing or for the curing with actinic radiation.

Examples of suitable reactive diluents (E) for the thermal curing are oligomeric polyols which are the obtainable from oligomeric intermediates, themselves obtained by metathesis reactions of acyclic monoolefins and cyclic monoolefins, by hydroformylation and subsequent hydrogenation; examples of suitable cyclic monoolefins are cyclobutene, cyclopentene, cyclohexene, cyclooctene, cycloheptene, norbonene or 7-oxanorbonene; examples of suitable acyclic monoolefins are contained in hydrocarbon mixtures which are obtained in petroleum processing by cracking ($C_5$ cut); examples of suitable oligomeric polyols for inventive use have a hydroxyl number of from 200 to 450, a number-average molecular weight Mn of from 400 to 1 000 and a mass-average molecular weight Mw of from 600 to 1 100;

Further examples of suitable polyols are branched, cyclic and/or acyclic $C_9$–$C_{16}$ alkanes functionalized with at least two hydroxyl groups, especially diethyloctanediols.

Further examples of polyols for use are hyperbranched compounds containing a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethylbutane-1,4-diol (homopentaerythritol). These reactive diluents may be prepared by the customary and known methods of preparing hyperbranched and dendrimer compounds. Suitable synthesis methods are described, for example, in the patents WO 93/17060 or WO 96/12754 or in the book by G. R. Newkome, C. N. Moorefield and F. Vögtle, "Dendritic Molecules, Concepts, Syntheses, Perspectives", VCH, Weinheim, New York, 1996.

Suitable radiation-curable reactive diluents (E) include low molecular mass, polyfunctional, ethylenically unsaturated compounds. Examples of suitable compounds of this kind are esters of acrylic acid with polyols, such as neopentyl glycol diacrylate, trimethylolpropane triacrylate, pentaerythritol triacrylate or pentaerythritol tetracrylate; or reaction products of hydroxyalkyl acrylates with polyisocyanates, especially aliphatic polyisocyanates.

If desired, the coating materials of the invention may also include up to 50% by weight, based on the overall amount of the binders, of one or more hydroxyl-containing binders (F) other than (A), such as linear and/or branched and/or block, comb and/or random poly(meth)acrylates, polyesters, polyurethanes, acrylated polyurethanes, acrylated polyesters, polylactones, polycarbonates, polyethers, (meth) acrylatediols or polyureas.

The coating material of the invention may comprise the above-described constituents in molecularly disperse solution and/or dispersion in the aqueous phase (C). Advantageously the constituents are dispersed in the aqueous phase (C), since this generally does not necessitate any addition of organic cosolvents. In this case the constituents and thus the coating material of the invention may be present in finely divided liquid or solid form in the dispersion. Where they are present in finely divided solid form, the coating material of the invention comprises a powder coating slurry.

The aqueous phase (C) comprises essentially water. In this context, the aqueous medium (C) may, in minor amounts, include other solid, liquid or gaseous organic and/or inorganic substances with low and/or high molecular mass in molecularly disperse solution. In the context of the present invention, the term "minor amount" is to be understood as an amount which does not remove the aqueous nature of the aqueous medium (C).

In the case of the aqueous phase (C) the phase may also, however, be straight water.

Viewed in terms of its method, the preparation of the coating material of the invention has no special features but instead took place by the dispersing of its constituents in the aqueous medium (C), in which context it is possible to employ primary or secondary dispersion techniques. By way of example, reference is made to the prior art cited at the outset.

The coating material of the invention is outstandingly suitable for the production of single-coat or multicoat clear or color and/or effect coating systems.

The single-coat and multicoat systems of the invention may be produced by a very wide variety of processes. It is of advantage to produce them in accordance with the processes of the invention.

The process of the invention starts from the substrate that is to be coated. The substrate may consist of metal, wood, plastic, glass or paper or may comprise these materials in the form of composites. Preferably, the substrates in question are automobile bodywork parts or industrial components, including containers, made of metal.

The substrate may have been provided with a primer. In the case of plastics, the primer in question is a so-called hydroprimer, which is cured before the coating material of the invention, especially the aqueous basecoat material or the clearcoat material, is applied. In the case of metals, especially automobile bodywork parts, the primers in question are customary and known cured electrocoats to which a primer-surfacer is applied and baked.

Following application, the coating material of the invention is subjected in a customary and known manner to curing, thermally and/or with actinic radiation. The first process of the invention is particularly suitable for the production of single-coat clearcoats or color and/or effect paint coats (topcoats) on said substrates.

The second process of the invention is particularly suitable for the production of a multicoat color and/or effect coating system by the wet-on-wet technique. The wet-on-wet technique for the production of multicoat topcoats is described, for example, in the patents U.S. Pat. No. 3,639,147, DE-A-33 33 072, DE-A-38 14 853, GB-A-2 012 191, U.S. Pat. No. 3,953,644, EP-A-0 260 447, DE-A-39 03 804, EP-A-0 320 552, DE-A-36 28 124, U.S. Pat. No. 4,719,132, EP-A-0 297 576, EP-A-0 069 936, EP-A-0 089 497, EP-A-0 195 931, EP-A-0 228 003, EP-A-0 038 127 and DE-A-28 18 100.

For this purpose an aqueous basecoat material is applied in a process step (I) to the surface of one of the above-described substrates and is flashed off and provisionally dried (process step II), but not cured.

In a process step (III), a clearcoat film is applied to the surface of the aqueous basecoat film.

In process step (IV), the aqueous basecoat film and the clearcoat film are cured together, physically or thermally and, if desired, with actinic light (wet-on-wet technique). Accordingly, in the context of the second process of the invention it is also possible to use the physically curing coating materials of DE-A-44 14 032 which contain no crosslinking agents (B). This accounts for a particular advantage of the second process of the invention, which can be used in particular for the gentle coating of thermally sensitive substrates such as plastics.

As far as the thermal cure is concerned, the baking temperature is guided in particular by whether the coating materials used in each case are one-component (1K) or two-component (2K) or multicomponent (3K, 4K), systems. In the case of one-component (1K) systems, the baking temperatures employed are generally above 120° C. In the case of two-component (2K) or multicomponent (3K, 4K) systems, the baking temperatures are normally below 100° C., in particular below 80° C.

Furthermore, it is possible in an additional process step (V) to apply a further clearcoat film to the surface of the clearcoat film, the second clearcoat film differing materially from the first clearcoat film. This film is then cured in a process step (VI). For curing, the methods described above are employed, depending on the clearcoat material used. This variant of the process of the invention comes to bear in particular in the context of automotive refinish.

Alternatively to this variant of the process of the invention the clearcoat film applied in process step (III) may be merely provisionally dried in process step (IV). Subsequently, in process step (V), the further clearcoat film is applied wet-on-wet, after which the paint films are cured together (extended wet-on-wet technique).

At least one of the above-described paint films is produced from a coating material of the invention. In other words, the aqueous basecoat film and/or the clearcoat film or at least one of the clearcoat films is or are produced from a coating material of the invention. In accordance with the invention it is of advantage if the aqueous basecoat film is produced from a coating material of the invention.

In this context it is found to be a further particular advantage of the coating material of the invention and of the process of the invention that all customary and known clearcoat materials may be combined with the aqueous basecoat film of the invention in the context of the second process of the invention.

Examples of suitable known one-component (1K), two-component (2K) or multicomponent (3K, 4K) clearcoat materials are known from the patents DE-A-42 04 518, U.S. Pat. No. 5,474,811, UD-A-5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

One-component (1K) clearcoat materials contain, as is known, hydroxyl-containing binders and crosslinking agents such as blocked polyisocyanates, tris(alkoxycarbonylamino) triazines and/or amino resins. In another variant they comprise as binders polymers containing lateral carbamate and/or allophanate groups and carbamate- and/or allophanate-modified amino resins as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

Two-component (2K) or multicomponent (3K, 4K) clearcoat materials are known to contain as essential constituents hydroxyl-containing binders and polyisocyanates as crosslinking agents, which are stored separately up to the time of their use.

Examples of suitable powder clearcoat materials are, for example, known from the German patent DE-A-42 22 194 or from the BASF Lacke+Farben AG product information "Pulverlacke" [Powder Coating Materials], 1990.

The familiar essential constituents of powder clearcoat materials comprise binders containing epoxide groups and polycarboxylic acids as crosslinking agents.

Examples of suitable powder slurry clearcoat materials are known, for example, from the U.S. Pat. No. 4,268,542 and from the German patent applications DE-A-195 18 392.4 and DE-A-196 13 547 or are described in the German patent application DE-A-198 14 471.7, unpublished at the priority date of the present specification.

Powder slurry clear coat materials are known to comprise powder clearcoat materials dispersed in an aqueous medium.

UV-curable clearcoat materials are disclosed, for example, in the patents EP-A-0 540 884, EP-A-0 568 967 or U.S. Pat. No. A-4,675,234.

In the context of the processes of the invention described above, the coating materials may be applied to the substrates by customary application methods, such as spraying, knife coating, brushing, flow coating, dipping or rolling, for example. For curing, it is possible to employ the customary and known methods such as heating in a forced air oven, irradiation with IR lamps, and where appropriate, with UV lamps.

Within the multicoat paint system of the invention, the thickness of the individual coats may vary widely. In accordance with the invention, however, it is of advantage if the basecoat has a thickness of from 5 to 25 μm, in particular from 7 to 15 μm, and the single-coat or two-coat clearcoat has a thickness overall of from 15 to 120 μm, preferably from 40 to 80 μm, and in particular from 60 to 70 μm. The ratio of the coat thicknesses may vary widely here, although it is of advantage on economic grounds if the first clearcoat is the thicker of the two coats. This clearcoat may then provide, so to speak, the base properties of the multicoat clearcoat, with particular desirable performance properties being set by means of the second clearcoat with its different, possibly specially selected composition.

The single-coat and multicoat systems of the invention exhibit outstanding optical, mechanical, and chemical properties. Accordingly, they are free from any surface defects such as shrinkage (wrinkling).

As clearcoats they are of outstanding transparency and scratch resistance. The etch resistance is outstanding.

As aqueous basecoats, they possess a particularly high hiding power and outstanding optical effects, especially metallic effects.

In the case of the multicoat systems of the invention, no delamination due to deficient intercoat adhesion is observable. The very particular advantage of the multicoat system of the invention lies in the fact that the profile of properties of its surface can be varied in a very particularly broad manner and can therefore be adapted, simply and precisely, to a very wide variety of requirements.

The coating materials of the invention and the processes of the invention are therefore outstandingly suitable for the production of single-coat or multicoat clear or pigmented coating systems for automotive OEM finishing and refinish, for industrial coating including coil coating and container coating, for the coating of plastics, and for furniture coating.

EXAMPLES

Comparative Test

Preparation Example 1

Preparation of a Polyesterpolyol

In a steel reactor suitable for polycondensation reactions, 4 634 kg of Pripol® 1013 (dimer fatty acid from Unichema), 1 522 kg of 1,6-hexanediol, 1 874 kg of isophthalic acid and 331 kg of xylene as azeotrope former were weighed out and heated to 150° C. The temperature of the mixture was raised (max. 220° C.) in such a way that the column overhead temperature did not exceed 125° C. Starting at an acid number of 5 mg KOH/g, distillation was commenced, and the condensation reaction was continued until an acid number of 3.5 mg KOH/g had been reached. The resulting polyesterpolyol was diluted with methyl ethyl ketone so as to give a solids content of 73%.

Example 1

The Preparation and Use of the Polyurethane (A) for Inventive Use 143.4 kg of the polyesterpolyol from preparation example 1 were heated together with 9.4 kg of dimethylolpropionic acid, 1.9 kg of neopentyl glycol, 50.5 kg of bis(4-isocyanatocyclohexyl)methane with a trans/trans content of 17% by weight, based on the diisocyanate, and 44 kg of methyl ethyl ketone until a constant isocyanate content had been reached. Then, based on a content of 1.1% by weight of free isocyanate groups, 4.9 kg of trimethylolpropane were added. In a viscosity range of from 12 to 14 dPas (measured 1:1 in N-methylpyrrolidone), further reaction was prevented by the addition of 2.7 kg of n-butanol. Following 60 minutes of stirring at 82° C., 5.0 kg of dimethylethanolamine were added. Following 30 minutes of stirring at 82° C., 34.2 kg of Pluriol® P900 (dispersing aid from BASF AG) were added. The resulting mixture was stirred at 82° C. for 30 minutes. Thereafter, the solids content was adjusted to 70% by weight (one hour/130° C.) using methyl ethyl ketone. 434.9 kg of deionized water were added to the resulting solution.

The resulting dispersion had a solids content of 27.8% by weight and a pH of 7.82. It was homogeneous and free from specks and strings.

The methyl ethyl ketone was removed by vacuum distillation down to a residual content of less than 0.5% by weight. The resulting dispersion was adjusted to a solids content of 30.3% by weight using deionized water. The pH was 7.73. It was free from specks and strings even following prolonged storage.

The dispersion was used in place of the polyurethane dispersions of examples 1.1, 1.2 and 1.3 of EP-A-0 574 417 for the preparation of aqueous basecoat materials and for the production of multicoat paint systems in accordance with examples 2., 3. and 4. of EP-A-0 574 417. The resulting aqueous basecoat materials were found to be highly stable on storage and easy to apply. The corresponding multicoat paint systems exhibited high brilliance in conjunction with an outstanding metallic effect.

Comparative Test 1

The Preparation and Use of a Conventional Polyurethane Dispersion

Example 1 was repeated but using, instead of bis(4-isocyanatocyclohexyl)methane with a trans/trans content of 17% by weight, based on the diisocyanate, a of bis(4-isocyanatocyclohexyl)methane with a trans/trans content of 32% by weight, based on the diisocyanate.

The resulting dispersion had specks and strings, especially following prolonged storage.

Similarly, the aqueous basecoat materials prepared using the dispersion were found to be less stable on storage and less readily applicable than the aqueous basecoat materials of example 1. Accordingly, the multicoat paint systems produced using these basecoat materials were also inferior to those of example 1.

What is claimed is:

1. An aqueous coating material, curable by at least one of thermally and with actinic radiation, comprising
   A) a binder comprising at least one polyurethane that is at least one of saturated, unsaturated, and grafted with olefinically unsaturated compounds comprising a reaction product of bis(4-isocyanatocyclohexyl)methane and at least one coreactant; wherein the bis(4-isocyanatocyclohexyl)methane has a trans/trans content of less than 20% by weight of the bis(4-isocyanatocyclohexyl)methane; and the polyurethane is at least one of ionically stabilized and nonionically stabilized; and
   B) at least one crosslinking agent.

2. The aqueous coating material of claim 1 further comprising a pigment comprising at least one of a color pigment and an effect pigment.

3. The aqueous coating material of claim 1, wherein the polyurethane contains at least one of a functional group and a nonionic hydrophilic group, wherein the functional group is one of
   (a1) a first functional group that can be converted into cations by at least one of neutralizing agents, quaternizing agents, and cationic groups, and
   (a2) a second functional group that can be converted into anions by at least one of neutralizing agents and anionic groups.

4. The aqueous coating material of claim 1, wherein the aqueous coating material is one of a one-component coating material, a two-component coating material, and a multicomponent coating material.

5. The aqueous coating material of claim 4, wherein the aqueous coating material is one of a two-component coating material and a multicomponent coating material and wherein the crosslinking agent comprises at least one polyisocyanate.

6. The aqueous coating material of claim 5 further comprising an additional crosslinking agent comprising at least one blocked polyisocyanate.

7. The aqueous coating material of claim 4, wherein the aqueous coating material is a one-component coating material, and wherein the crosslinking agent comprises at least one of at least one epoxide compound containing at least two epoxide groups per molecule, at least one amino resin, at least one tris(alkoxycarbonylamino)triazine, and at least one beta-hydroxyalkylamide.

8. The aqueous coating material of claim 1, wherein the aqueous coating material comprises at least the binder, the crosslinking agent, and a pigment comprising at least one of a color pigment and an effect pigment in a dispersion in an aqueous phase.

9. A method comprising applying the aqueous coating material of claim 1 to a substrate to produce an at least one coat coating systems for at least one of an automotive OEM finish, an automotive refinish, an industrial coating, a coil coating, a container coating, a plastics coating, and a furniture coating, wherein the coating system is one of clear and pigmented.

10. The method of claim 9, wherein the aqueous coating material is at least one of a clearcoat material, an aqueous basecoat material, and a solid-color topcoat material, and the coating system is at least one of the automotive OEM finish and the automotive refinish.

11. A process for producing an at least one coat coating system, wherein the coating system comprises at least one of a clear coating system, a color coating system, and an effect coating system, comprising applying at least one film of the aqueous coating material of claim 1 to a primed or unprimed substrate and curing the at least one film by at least one of thermally and with actinic light.

12. A process for producing a multicoat coating system comprising at least one of a color coating system and an effect coating system, by a wet-on-wet technique, comprising
   (I) applying an aqueous basecoat film to a primed or unprimed substrate,
   (II) flashing off and optionally drying the aqueous basecoat film,
   (III) applying a clearcoat film to the aqueous basecoat film, and
   (IV) curing the aqueous basecoat film and the clearcoat film by at least one of thermally and with actinic light,
wherein material for at least one of the aqueous basecoat film and the clearcoat film is at least one of physically curable, thermally curable, and curable with actinic radiation, and wherein the material comprises at least one polyurethane in a dispersion in an aqueous phase, wherein the polyurethane is at least one of saturated, unsaturated, and grafted with olefinically unsaturated compounds, the polyurethane comprises a reaction product of bis(4-isocyanatocyclohexyl)methane and a coreactant, the bis(4-isocyanatocyclohexyl)methane has a trans/trans content of less than 20% by weight of the bis(4-isocyanatocyclohexyl)methane, and the polyurethane is at least one of ionically stabilized and nonionically stabilized.

13. A process for producing a multicoat coating system comprising at least one of a color coating system and an effect coating system, by a wet-on-wet technique, comprising one of:
   (A) a first method comprising:
      (I) applying an aqueous basecoat film to a primed or unprimed substrate,
      (II) flashing off and optionally drying the aqueous basecoat film,
      (III) applying a first clearcoat film to the aqueous basecoat film,
      (IV) curing the aqueous basecoat film and the first clearcoat film by at least one of thermally and with actinic light, and
      (V) applying a second clearcoat film, which is materially different from the first clearcoat film, to the cured aqueous basecoat and first clearcoat film;
   (B) a second method comprising:
      (I) applying an aqueous basecoat film to a primed or unprimed substrate,
      (II) flashing off and optionally drying the aqueous basecoat film,
      (III) applying a first clearcoat film to the aqueous basecoat film,
      (IV) flashing off and optionally drying the first clearcoat film,
      (V) applying a second clearcoat film, which is materially different from the first clearcoat film, to the first clearcoat film, and
      (VI) conjointly curing the aqueous basecoat film, the first clearcoat film, and the second clearcoat film;
wherein material for at least one of the aqueous basecoat film, the first clearcoat film, and the second clearcoat film is at least one of physically curable, thermally curable, and curable with actinic radiation,
and wherein the material comprises at least one polyurethane that is at least one of saturated, unsaturated, and grafted with olefinically unsaturated compounds comprising a reaction product of bis(4-isocyanatocyclohexyl)methane and at least one coreactant; wherein the bis(4-isocyanatocyclohexyl)methane has a trans/trans content of less than 20% by weight of the bis(4-isocyanatocyclohexyl) methane; and the polyurethane is at least one of ionically stabilized and nonionically stabilized.

14. An at least one coat coating system produced by the processes of claim 11.

15. An at least one coat coating system produced by the processes of claim 12.

16. An at least one coat coating system produced by the processes of claim 13.

17. The process of claim 13, wherein the material further comprises a crosslinking agent, and wherein the polyurethane is in a dispersion in an aqueous phase.

* * * * *